Apr. 24, 1923.
O. W. PFEFFER
1,452,571
MEANS FOR CHECKING THE WEAR OF SHAFT BEARINGS
Filed Jan. 14, 1920
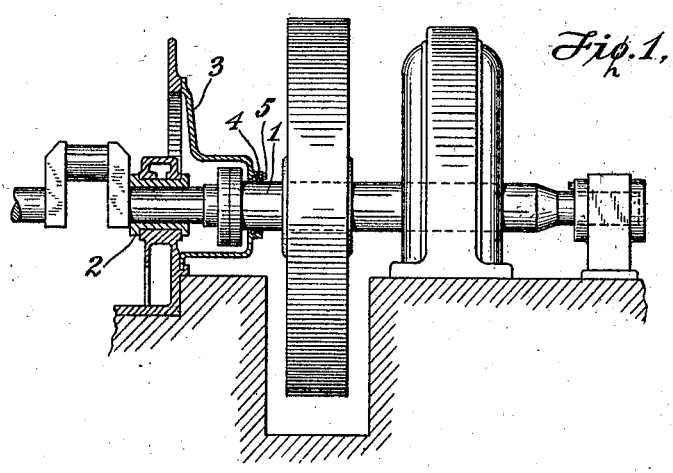
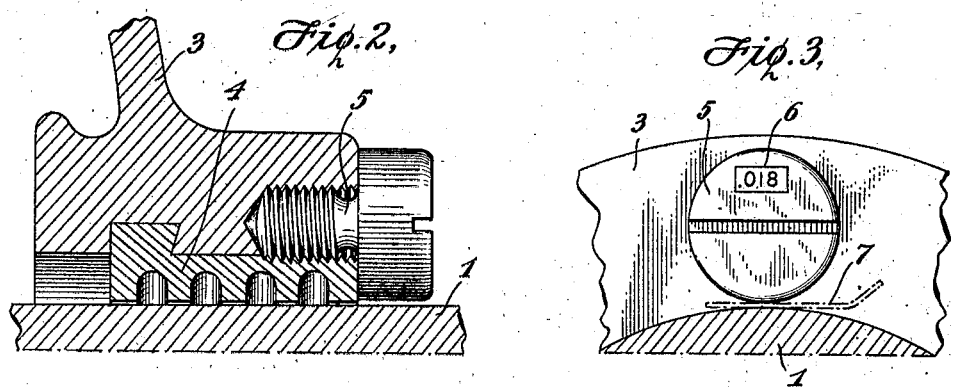
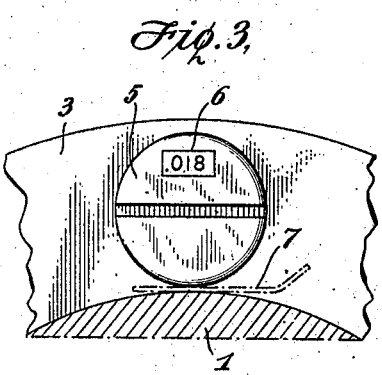
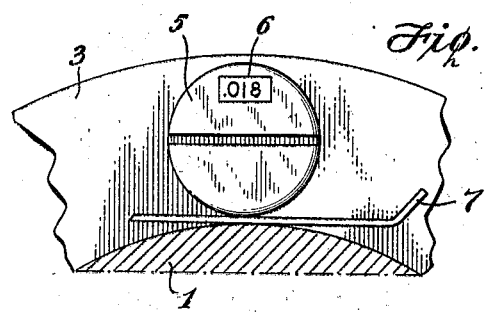
INVENTOR
Oscar W. Pfeffer
BY
Jeffery Kimball & Eggleton
ATTORNEYS Patented Apr. 24, 1923.

1,452,571

UNITED STATES PATENT OFFICE.

OSCAR W. PFEFFER, OF ST. LOUIS, MISSOURI, ASSIGNOR TO BUSCH-SULZER BROS.-DIESEL ENGINE CO., OF ST. LOUIS, MISSOURI, A CORPORATION OF MISSOURI.

MEANS FOR CHECKING THE WEAR OF SHAFT BEARINGS.

Application filed January 14, 1920. Serial No. 351,504.

*To all whom it may concern:*

Be it known that I, OSCAR W. PFEFFER, a citizen of the United States of America, residing in the city of St. Louis, State of Missouri, have made certain new and useful Improvements in Means for Checking the Wear of Shaft Bearings, of which the following is a specification.

The object of my invention is to check or observe for adjustment or otherwise, the wear of moving shafts or their bearings, and particularly to check the wear of rotating shaft bearings with relation to the bearing shells. For these purposes, I provide an index means forming a reference point from which to measure the position of the shaft as later appears.

In the accompanying single sheet of drawing which forms a part of this application: Fig. 1 is an elevation partly in section of a machine having a rotating shaft to which my invention is applied. Fig. 2 is a sectional view of the part of this machine adjacent the index. Figs. 3 and 4 are elevations of the index, the adjacent shaft being shown in section in two positions.

The machine shown in the drawing is merely representative of any machine having a moving shaft 1 carried in a bearing 2; the lower shell of this bearing carrying the weight, the direction of wear is downward. Adjacent this bearing and in permanently fixed relation thereto, a part of an engine casing 3 surrounds the shaft with which it more or less lightly engages through the box 4. In vertical relation to the shaft 1, the casing 3 supports an accessible index means in the form of a headed screw 5 set into the exterior of casing 3 substantially parallel with the axis of the shaft, the head of the screw overhanging an accessible part of the shaft 1 and standing very close thereto in the line of the wear of the bearing. In the present case the shaft moves away from the index or reference point as the bearing wears. Preferably for readier and more accurate measurement, the head of the screw is round. A surface on the head of the screw carries an indication (as at 6) of an initial clearance between the head of the screw and the shaft; preferably this indication is of the clearance between the screw and the shaft when the machine was first completely assembled and ready for operation or shortly after the bearing was last furnished with new bearing shells. This original clearance may be ascertained by the feelers or thickness gauges 7 of known or determinable thickness which will pass between the head of the screw and the shaft as shown in Fig. 3; the wear can be ascertained from time to time by the increase in thickness of the gauges which it is possible to pass between these points as in Fig. 4, the value of the original clearance for comparison being always readily available at the indication 6. The screw head thus provides a ready means for determining the exact extent of wear of the shaft and its bearings without requiring the bearings to be taken apart or other parts removed.

Claims—

1. The combination with a machine comprising a rotary shaft and a bearing therefor, of an index means set in a fixed position proximate to a part of the shaft adjacent the bearing and in the line of the bearing wear, the surface of the index proximate to the shaft being spaced from the shaft a distance suited for measurement by flat feeler gauges.

2. The combination with a machine comprising a rotatable shaft, a bearing therefor, and a support adjacent thereto having a permanently fixed relation to the wearing portion of the bearing, of a screw set into said support with its head closely adjacent the shaft and having a portion of its surface located in the line of the wear of the bearing, the screw having a surface bearing an indication of an initial relation of said portion to the shaft.

3. The combination with a machine comprising a rotatable shaft and a bearing therefor including a member in permanently fixed relation to the wearing portion of the bearing, of a part set into said member having a round head adjacent the shaft and located in the line of the wear of the bearing and associated with a surface on the machine bearing an inscription of an initial relation between said head and shaft.

4. The combination with a machine comprising a movable shaft and a fixed part adjacent said shaft, of index means proximate to the shaft and in line of wear thereof and forming a reference point from which to measure any change of position of said shaft relative to the said fixed part, and associated with a surface on the machine bearing an indication of an initial relation of the parts.

In testimony whereof, I have signed this specification.

OSCAR W. PFEFFER.